United States Patent
Arnold et al.

(10) Patent No.: US 7,002,597 B2
(45) Date of Patent: Feb. 21, 2006

(54) DYNAMIC SELECTION OF ANTI-ALIASING PROCEDURES

(75) Inventors: R. David Arnold, Mountain View, CA (US); Terence S. Dowling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 42 days.

(21) Appl. No.: 10/440,489

(22) Filed: May 16, 2003

(65) Prior Publication Data

US 2004/0227771 A1    Nov. 18, 2004

(51) Int. Cl.
  *G09G 5/00* (2006.01)
  *G06T 11/00* (2006.01)
  *G06K 9/40* (2006.01)
(52) U.S. Cl. .................. 345/611; 345/469; 382/269
(58) Field of Classification Search ............. 345/611; 382/269
  See application file for complete search history.

(56) References Cited

U.S. PATENT DOCUMENTS

| | | | |
|---|---|---|---|
| 4,331,955 A | 5/1982 | Hansen | |
| 4,486,785 A | 12/1984 | Lasher et al. | |
| 4,580,231 A | 4/1986 | Tidd et al. | |
| 4,591,844 A | 5/1986 | Hickin et al. | |
| 4,667,247 A | 5/1987 | Karow | |
| 4,672,369 A | 6/1987 | Preiss et al. | |
| 4,675,830 A | 6/1987 | Hawkins | |
| 4,720,705 A | 1/1988 | Gupta et al. | |
| 4,780,711 A | 10/1988 | Doumas | |
| 4,783,652 A | 11/1988 | Lumelsky | |
| 4,827,255 A | 5/1989 | Ishii | |
| 4,851,825 A | 7/1989 | Naiman | |
| 4,907,282 A | 3/1990 | Daly et al. | |
| 4,908,780 A | 3/1990 | Priem et al. | |
| 4,945,351 A | 7/1990 | Naiman | |
| 5,099,435 A | 3/1992 | Collins et al. | |
| 5,132,674 A | 7/1992 | Bottorf | |
| 5,241,653 A | 8/1993 | Collins et al. | |
| 5,278,678 A | 1/1994 | Harrington | |
| 5,299,308 A | 3/1994 | Suzuki et al. | |
| 5,301,267 A | 4/1994 | Hassett et al. | |
| 5,386,509 A | 1/1995 | Suzuki et al. | |
| 5,398,306 A | 3/1995 | Karow | |
| 5,459,828 A | 10/1995 | Zack et al. | |
| 5,544,294 A | 8/1996 | Cho et al. | |
| 5,568,597 A | 10/1996 | Nakayama et al. | |
| 5,684,510 A * | 11/1997 | Brassell et al. | ............. 345/443 |
| 5,771,048 A | 6/1998 | Nankou et al. | |

(Continued)

FOREIGN PATENT DOCUMENTS

EP    0 214 547    3/1987

(Continued)

OTHER PUBLICATIONS

"gasp—Grid-fitting And Scan-conversion Procedure", http://www.microsoft.com/typography/otspec/gasp.htm, 1998, 2 pages.

(Continued)

*Primary Examiner*—Kee M. Tung
*Assistant Examiner*—Aaron M. Richer
(74) *Attorney, Agent, or Firm*—Fish & Richardson P.C.

(57) ABSTRACT

Methods, apparatus, including computer program products, and systems implement and use techniques for rendering glyphs. A plurality of glyphs to be rendered are received. For each glyph, an anti-aliasing procedure is selected to render the glyph. The anti-aliasing procedure is selected from a first anti-aliasing procedure and one or more alternative anti-aliasing procedures. The anti-aliasing procedure for each glyph is selected based on the glyph.

42 Claims, 7 Drawing Sheets

U.S. PATENT DOCUMENTS

| | | | |
|---|---|---|---|
| 5,857,067 A | | 1/1999 | Hassett et al. |
| 5,910,805 A | | 6/1999 | Hickey et al. |
| 5,929,866 A | | 7/1999 | Arnold |
| 5,940,080 A | | 8/1999 | Ruehle et al. |
| 5,943,063 A | | 8/1999 | Dowling |
| 6,104,833 A | * | 8/2000 | Naoi et al. .................. 382/190 |
| 6,236,390 B1 | | 5/2001 | Hitchcock |
| 6,282,327 B1 | | 8/2001 | Betrisey et al. |
| 6,342,890 B1 | | 1/2002 | Shetter |
| 6,356,278 B1 | | 3/2002 | Stamm et al. |
| 6,438,576 B1 | * | 8/2002 | Huang et al. ................ 709/202 |
| 6,563,502 B1 | | 5/2003 | Dowling et al. |
| 6,614,432 B1 | | 9/2003 | Merrill |
| 2001/0048764 A1 | | 12/2001 | Betrisey et al. |
| 2002/0093476 A1 | | 7/2002 | Hill et al. |
| 2003/0214513 A1 | * | 11/2003 | Brown et al. ................ 345/611 |
| 2004/0001069 A1 | * | 1/2004 | Snyder et al. ............... 345/582 |

FOREIGN PATENT DOCUMENTS

| | | |
|---|---|---|
| EP | 0 397 299 | 11/1990 |
| EP | 0 428 356 | 5/1991 |
| EP | 0 435 391 | 7/1991 |
| EP | 0 468 652 | 1/1992 |
| EP | 0 506 381 | 9/1992 |
| EP | 0 304 509 | 6/1993 |
| EP | 0 590 923 | 4/1994 |
| EP | 0 654 778 | 5/1995 |
| EP | 0 667 596 | 8/1995 |
| EP | 0 693 740 | 1/1996 |
| EP | 0 772 144 | 5/1997 |
| EP | 1 077 445 A2 | 2/2001 |
| GB | 2 236 463 | 4/1991 |
| JP | 900039606 | 10/1991 |
| WO | 86/04703 | 8/1986 |
| WO | 94/06094 | 3/1994 |
| WO | 94/29843 | 12/1994 |
| WO | WO 00/52673 | 9/2000 |

OTHER PUBLICATIONS

"The TrueType instruction set", http://www.microsoft.com/typography/otspec/ttinst.htm, 1997, Cover sheet (1 page); pp. 181-261.

Foley et al., "Computer Graphics Principles and Practice—Second Edition"; Addison-Wesley Publishing Company; 1990; pp. 132-140, pp. 617-646, and pp. 965-979.

Platt, John C., Optimal Filtering for Patterned Displays, Microsoft Research, IEEE Signal Processing Letters, vol. 7, No. 7, pp. 179-180 (2000).

Betrisey, et al., 20.4: Displaced Filtering for Patterned Displays, SID 00 Digest, 4 pages.

Microsoft Corporation, What is ClearType? [online], page last updated Jan. 16, 2002, www.microsoft.com/typography/cleartype/what.htm?frame=%208fsize.

Microsoft Corporation, Microsoft ClearType FAQ [online], page last updated Sep. 26, 2002,. http://www.microsoft.com/typography/faq/faq15.htm.

Microsoft Corporation, ClearType Antialiasing, 2003 [online], http://msdn.microsoft.com/library/default.asp?url=/library/en-us/gdi/fonttext-osgn.asp.

Sub-Pixel Font Rendering Technology—Implementation Details, last edit on Dec. 8, 1999 [online], http://grc.com/cttech.htm.

Sub-Pixel Font Rendering Technology—Who Did It First? [online], last edit on Feb. 29, 2000, http://grc.com/ctwho.htm.

Sub-Pixel Font Rendering Technology—Visitor Dialog Q&A [online] last edit Oct. 4, 2003, http://grc.com/ctdialog.htm.

Sub-Pixel Font Rendering Technology—How It Works [online], last edit on Feb. 11, 2002, http://grc.com/ctwhat.htm.

* cited by examiner

DYNAMIC SELECTION OF ANTI-ALIASING PROCEDURES

BACKGROUND OF THE INVENTION

The present invention relates to rendering glyphs.

A character is an abstract construct that often, although not always, represents an atomic unit in some system of expression, such as a language. Each character can be represented by a set of character attributes that define the semantic information of the character. A character encoding associates the set of character attributes for a character with a particular encoding value—for example, a scalar value included in a character set standard, such as ASCII (American Standard Code for Information Interchanges) or Unicode.

A glyph is a visual representation of a character, such as a graphical token or symbol. A glyph image is a particular image of a glyph that has been rasterized or otherwise imaged onto some display surface. A font is a collection of glyphs, and can include one or more corresponding mappings of glyphs to characters (i.e., to encoding values). A font is typically constructed to support a character set standard. That is, fonts include glyphs representing characters included in the character set standard. A glyph can be associated with a set of glyph attributes defining appearance information for a representation of the corresponding character, and generally provide the information necessary to render the glyph. A glyph can include, or can be associated with, a set of instructions for rendering the glyph. For example, TrueType™ fonts, available from Microsoft Corporation of Redmond, Wash., include glyphs that are associated with a set of instructions for use when rendering the glyph. A TrueType font program can include a component used for font-wide calculations and a per-glyph component used for rendering a specific glyph within the font.

Hinting is a method of defining which pixels are turned on in order to create the best possible glyph bitmap shape, particularly at small sizes and low resolutions. A glyph's outline determines which pixels will constitute the bitmap. It is often necessary to modify the outline to create the bitmap, i.e., modify the outline until the desired combination of pixels is turned on. In certain fonts, such as TrueType fonts, a hint is a mathematical instruction that is included in the font program that defines a distortion of a glyph's outline under particular rendering conditions.

Certain types of visual output devices for computer systems are capable of outputting in "gray scale". That is, each of the pixels in the raster matrix of the output device is capable of displaying a number of tones, typically from pure light to pure dark. Anti-aliasing is a technique of varying the gray scale or color values of the pixels representing a glyph image to provide the illusion of smoother curves and less jagged diagonal lines. Referring to FIGS. 1 and 2, an anti-aliasing technique can downsample a high resolution bitmap 105 to generate a gray scale representation 205 of a glyph image, the gray scale representation having varying tones of gray. For example, the ratio of the high resolution to the device resolution can be 4 to 1 in both x and y directions, illustrated by the grid 110 shown in FIG. 1, which grid corresponds to the device resolution. The device resolution is the maximum number of individual pixels that can be displayed on the computer output device used to display the corresponding glyph image. This technique, referred to herein as 4×4 anti-aliasing, provides the same "degree" of anti-aliasing in both x and y directions.

SUMMARY OF THE INVENTION

In general, in one aspect, the invention features methods, apparatus (including computer program products) and systems, implementing techniques for rendering glyphs. The techniques include receiving a plurality of glyphs to be rendered, and for each glyph, selecting an anti-aliasing procedure to render the glyph based on the glyph. The anti-aliasing procedure is selected from a first anti-aliasing procedure and one or more alternative anti-aliasing procedures.

In general, in another aspect, the invention features methods, apparatus (including computer program products) and systems implementing techniques for rendering a plurality of glyphs. The techniques include partially rendering each glyph using a first anti-aliasing procedure, determining on a glyph-by-glyph basis a preferred anti-aliasing procedure for each glyph based on the partial rendering, and rendering each glyph using the preferred anti-aliasing procedure determined for the glyph.

Implementations of the invention can include one or more of the following. Partially rendering a glyph can include calculating a hinted outline of the glyph. The partial rendering can be discarded, and the glyph rendered using one of the alternative anti-aliasing procedures. Alternatively, the glyph can be rendered using a selected alternative anti-aliasing procedure and the partial rendering of the glyph from the first anti-aliasing procedure.

Evaluating one or more characteristics of the glyph can include determining a complexity of the glyph and comparing the complexity to a predetermined threshold value. The complexity can be measured as a cumulative horizontal length of the glyph path divided by the size at which the glyph is to be rendered. Evaluating one or more characteristics of the glyph can include determining whether one or more specified hint instructions were used to partially render the glyph. The first anti-aliasing procedure can be an anisotropic anti-aliasing procedure. A glyph can be included in a TrueType™ font. Implementations of the invention can include one or more of the following advantageous features. Different anti-aliasing procedures can be used for different glyphs included in a font, particularly a font representing a broad range of characters, such as Latin-based characters and Japanese kanji characters. By selecting an anti-aliasing procedure for a glyph at the glyph level, the best anti-aliasing procedure for the specific glyph under the current rendering conditions can be used to render the glyph. Determining which anti-aliasing procedure to use to render a glyph based on characteristics of the glyph provides consistent, reliable results, because the behavior of the glyph under given rendering conditions can be evaluated. Partially rendering a glyph for the purpose of evaluating glyph characteristics is more efficient than fully rendering the glyph, and provides sufficient information for the evaluation.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 shows a high resolution bitmap representation of a glyph image representing the character a.

FIG. 2 shows a gray scale representation of a glyph image representing the character a.

Like reference numbers and designations in the various drawings indicate like elements.

DETAILED DESCRIPTION

Conventional glyph-rendering applications use a variety of different anti-aliasing procedures, some of which are more effective with certain glyphs, or certain glyph sizes, than with others. For example, an anti-aliasing procedure that is particularly effective with a glyph representing a Latin-based character may not provide the best looking glyph image for a glyph representing a Japanese kanji character. Similarly, an anti-aliasing procedure that works well at a size of 18 ppem (pixels per em) may be less effective at a size of 8 ppem.

A conventional 4×4 anti-aliasing procedure is described above in the Background. Other anti-dosing procedures are available, including anisotropic anti-chasing as described in Application No. 10/440,013, of R. David Arnald and Terence S. Dowling, entitled "Anisotropic Anti-Aliasing", filed May 16, 2003, with attorney docket number 07844-605001, which is incorporated by reference herein.

For example, an 8×1 anisotropic anti-aliasing procedure uses a fine grid having 8 pixels in the x direction and 1 pixel in the y direction for each corresponding pixel on the coarse grid. An 8×2 anisotropic anti-aliasing procedure uses a fine grid having 8 pixels in the x direction and 2 pixels in the y direction for each corresponding pixel on the coarse grid. Alternatively, an 8×2 anisotropic anti-aliasing procedure can use a fine grid having an 8×1 resolution to produce an outline (which can be hinted), which is then scaled by a factor of 2 in the y direction, before scan conversion into an 8×2 resolution bitmap. Other anisotropic and isotropic anti-aliasing procedures are also available.

Figure 1:
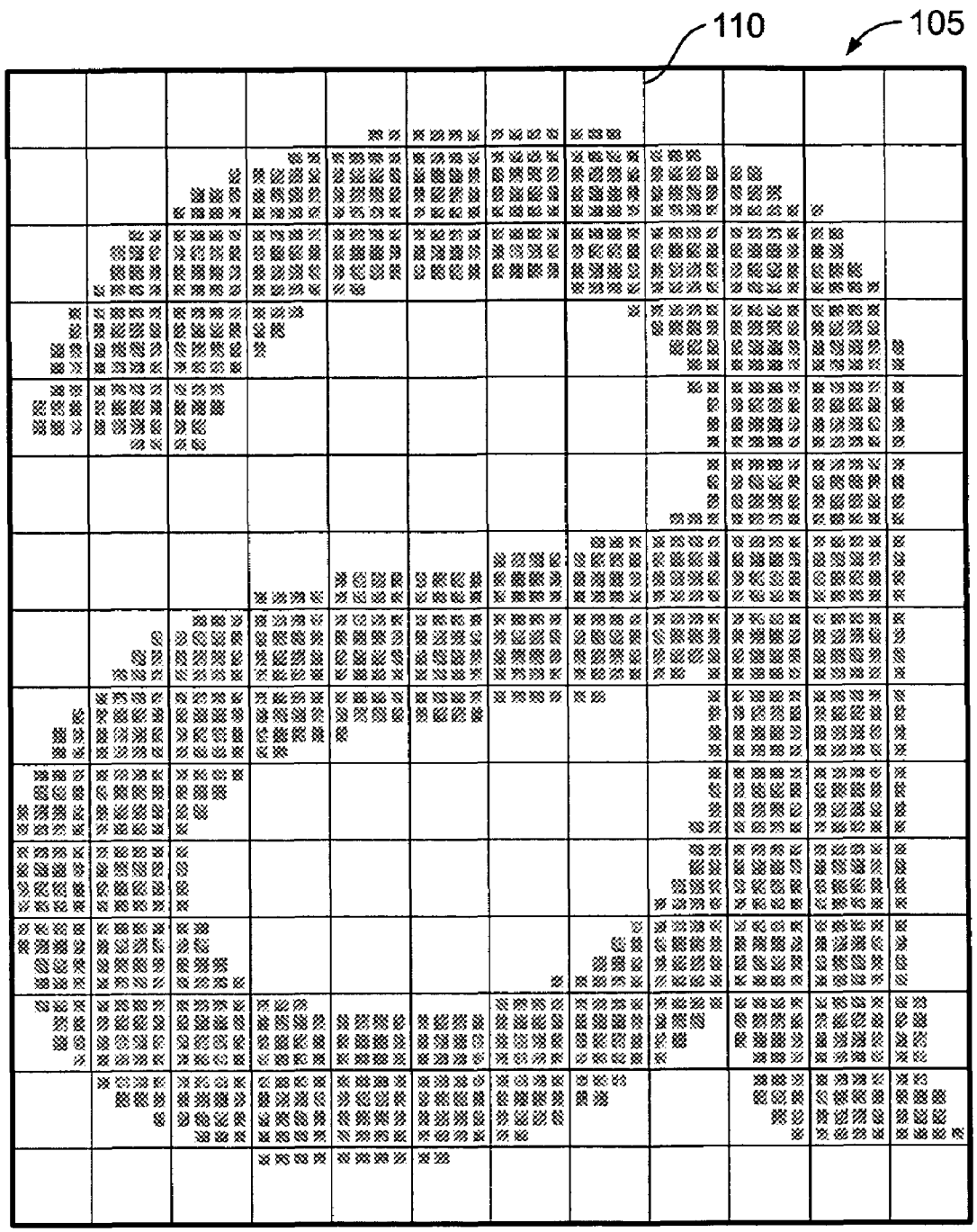
Figure 2:
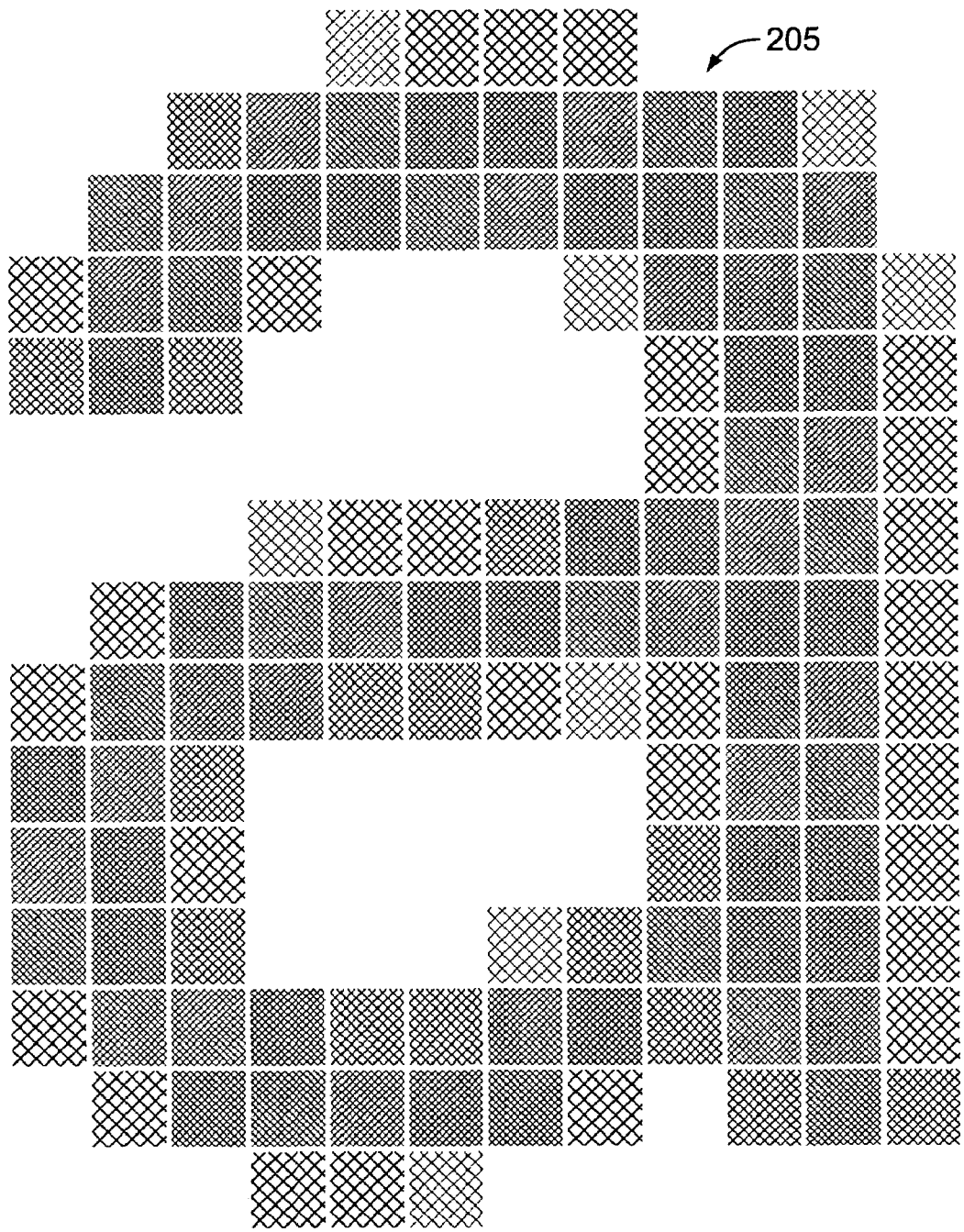
Figure 3:
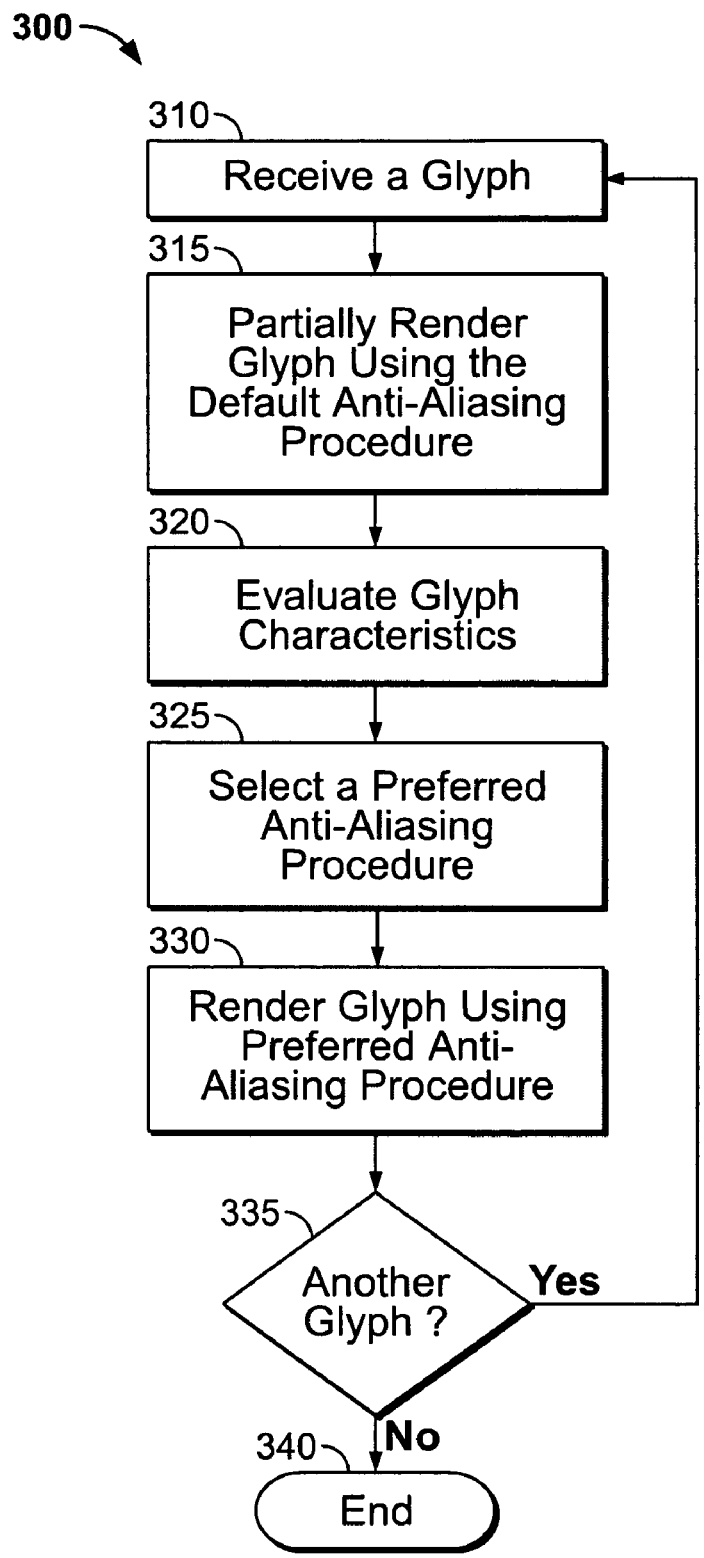
FIG. 3 is a flowchart showing a method for determining a preferred anti-aliasing procedure for a glyph.

As mentioned above, a different anti-aliasing procedure can be preferable for rendering different glyphs, or for rendering the same glyph under different rendering conditions. FIG. 3 illustrates a dynamic rendering method 300 that makes a glyph-by-glyph determination of the preferred anti-aliasing procedure for rendering each glyph in a text. For each glyph, the determination is based on characteristics of the glyph itself, which characteristics can change based on the rendering conditions. The method 300 begins by receiving a glyph to be rendered (step 310). The glyph can be included in a TrueType™ font, or another font, for example, a Type 1 font available from Adobe Systems Incorporated of San Jose, Calif.

The glyph is rendered using a default anti-aliasing procedure (step 315). After the rendering, the glyph's characteristics are evaluated (step 320). Based on the evaluation, a preferred anti-aliasing procedure is selected from the default anti-aliasing procedure and one or more alternative anti-aliasing procedures (step 325). The glyph is rendered using the selected anti-aliasing procedure (step 330), and steps 310–335 are repeated for each subsequent glyph (the "Yes" branch of step 335).

Figure 4:
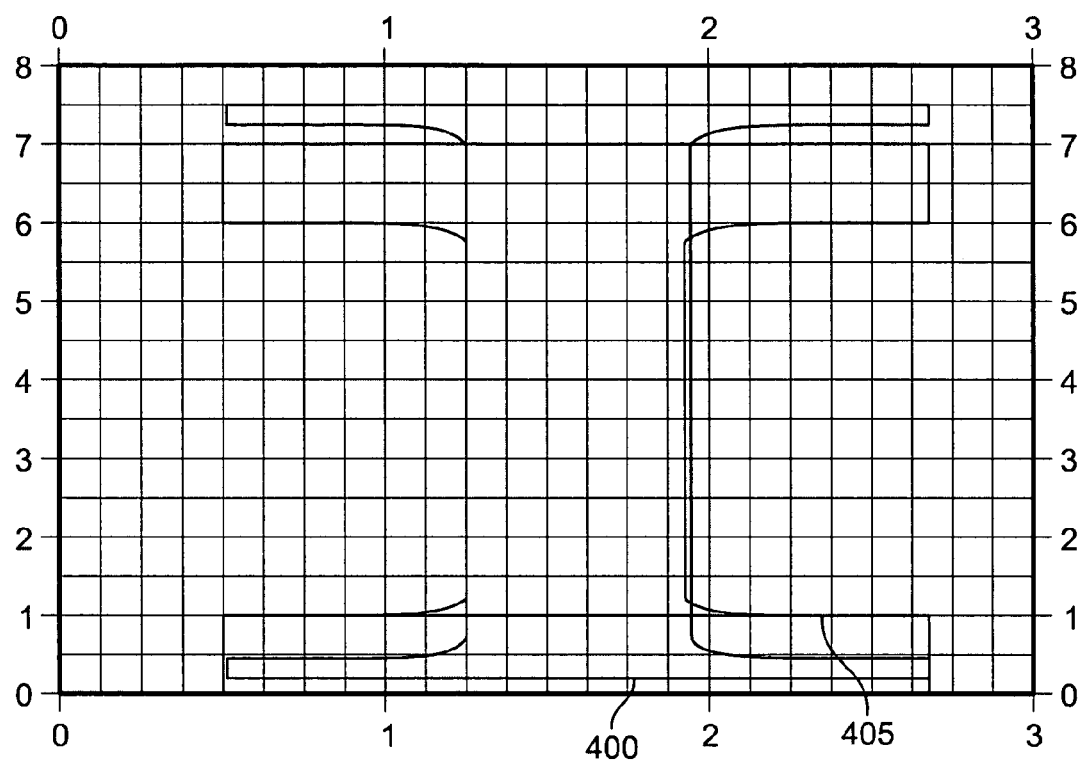
FIG. 4 shows an outline and a hinted outline of a glyph image representing a Latin-based character.

As discussed above, an anti-aliasing procedure is selected for a glyph based on the characteristics of the glyph under the conditions in which the glyph will be rendered. In some fonts, the characteristics of the glyph and how the characteristics will behave based on the rendering conditions can be undeterminable without rendering, or at least partially rendering, the glyph. Thus, the glyph can be completely rendered using the default anti-aliasing procedure. Alternatively, the glyph can be only partially rendered. In implementations in which the glyph is partially rendered, the glyph should be rendered to a point sufficient to reveal one or more glyph characteristics to be used in subsequent steps of the method. If the glyph is fully rendered in step 315, a subsequent determination in steps 320 and 325 that one of the alternative anti-aliasing procedures is preferred may require discarding the results of the rendering and completely re-rendering the glyph using the alternative anti-aliasing procedure. Partially rendering the glyph in step 315 can avoid some or all of this unnecessary processing. In one implementation, the glyph can be partially rendered by generating a hinted outline 405 of a glyph image as shown in FIG. 4.

One or more rules can be used to evaluate the glyph characteristics and determine a preferred anti-aliasing procedure for the glyph. A variety of different glyph characteristics can be used, the choice of which can vary depending on available anti-aliasing procedures. In one implementation, a complexity value is calculated for the glyph, and the calculated value is compared to a predetermined threshold value to identify a preferred anti-aliasing procedure. Complexity can be measured by dividing the cumulative horizontal length of the glyph path (in pixels) by the size at which the glyph will be rendered (e.g., in ppem) to give a complexity value. Other methods can be used to measure complexity, for example, a Fourier transform can be used to indicate spatial frequency.

Another useful glyph characteristic to evaluate is the hinting instructions used to render the glyph. The instructions associated with a glyph, including the hinting instructions, can behave differently depending on various input parameters relating to the rendering conditions. Some examples of input parameters include the point size, ppem, scaler version number, whether there is any rotation, whether there is any stretching, and whether the glyph is being hinted for gray scale rendering. The scaler is the program interpreting the glyph instructions, and older scaler versions do not include all of the features of newer versions.

By partially rendering a glyph to produce a hinted outline, hinting instructions used by the scaler under the given rendering conditions can be determined. For example, anisotropic anti-aliasing is most useful when glyphs are hinted in the y direction to font-wide aligmnent zones. In one implementation, if any of the following hint instructions are used to render the glyph, when the projection vector has a nonzero y component, then, subject to the complexity of the glyph, anisotropic anti-aliasing is the preferred anti-aliasing procedure:

a Move Direct Absolute Point (MDAP) instruction
 a Move Indirect Absolute Point (MIAP) instruction
 an Align Relative Point (ALIGNRP) instruction when the reference point (rp0) is the left sidebearing (LSB) point
 a Move Direct Relative Point (MDRP) instruction when the reference point (rp0) is the left sidebearing (LSB) point
 a Move Indirect Relative Point (MIRP) instruction when the reference point (rp0) is the left sidebearing (LSB) point.

Figure 5:
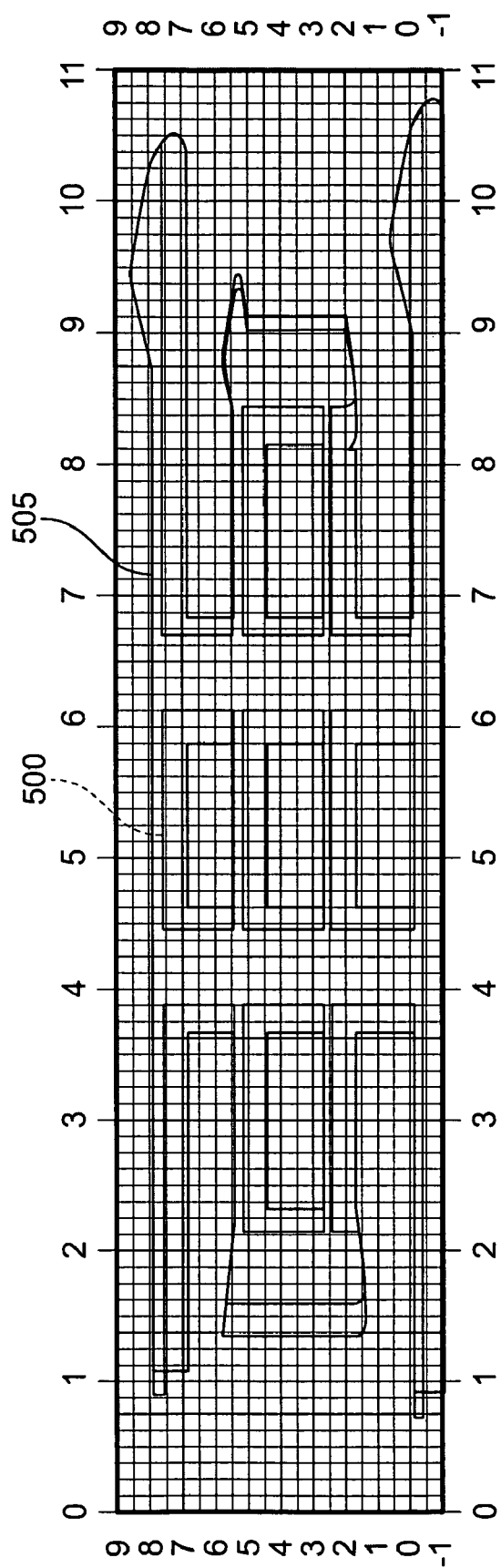
FIG. 5 shows an outline and a hinted outline of a glyph image representing a Japanese kanji character.
Figure 6:
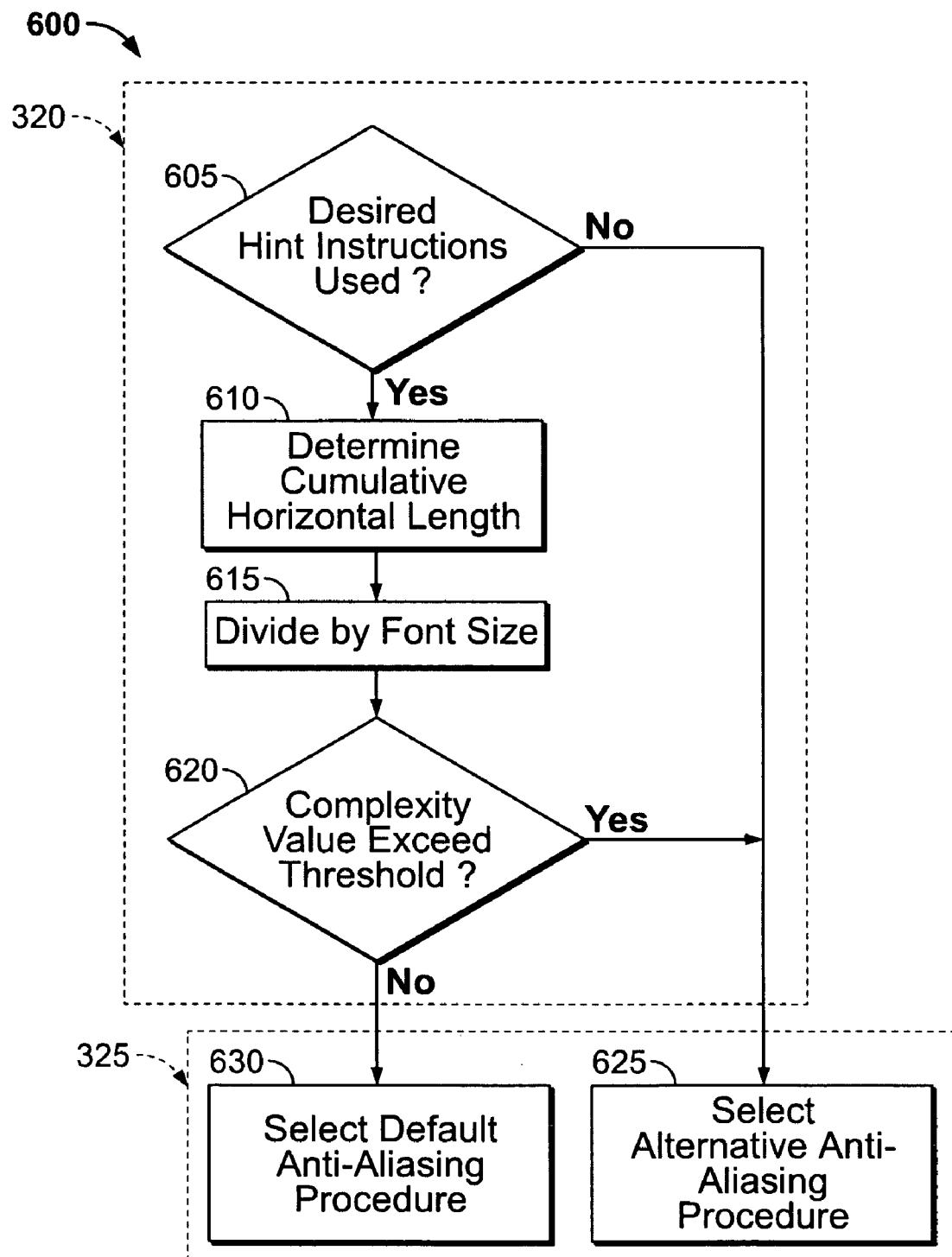
FIG. 6 is flowchart showing a method for evaluating characteristics of glyph.

FIG. 6 shows in more detail one implementation of a method 600 of evaluating a glyph's characteristics (step 320, FIG. 3) and selecting a preferred anti-aliasing procedure (step 345, FIG. 3). The partial rendering of the glyph is evaluated to determine whether certain hint instructions were used to partially render the glyph (step 605). For example, this criterion is satisfied if at least one of the hint instructions set out above was used to to partially render the glyph. By way of illustration, if in one example of this implementation, the hinted outline 405 shown in FIG. 4 was produced using the hint instruction Move Indirect Absolute Point (MIAP), the hint instruction criterion is satisfied (the "Yes" branch of decision step 605). By contrast, if none of the qualifying hint instructions were used to produce the hinted outline 505 representing a Japanese kanji character as shown in FIG. 5, the hint instruction criterion is not satisfied (the "No" branch of decision step 605).

If the hint instruction criteria is satisfied (the "Yes" branch of decision step 605), then a second criteria can be evaluated, in this example, the complexity of the glyph. Based on a partial rendering of the glyph, the cumulative horizontal length of the glyph path is determined (step 610). The cumulative horizontal length is divided by the size at which the glyph will be rendered to determine a complexity value (step 615). The complexity value is compared to a predetermined threshold value at decision step 620. In one implementation, the threshold value can be calculated as a percentage of the size at which the glyph will be rendered. The percentage can be determined empirically, and in the following example is expressed as 40% of the size (in ppem) at which the glyph will be rendered.

The partial rendering 405 of the glyph representing a Latin-based character shown in FIG. 4 has a cumulative horizontal length of 7.344 pixels at a size of 11 ppem, and thus a complexity value of 7.344/11 or 0.67. In this example, the complexity threshold value is 40% of 11 ppem or 4.4, below which an anisotropic anti-aliasing procedure is preferred over a conventional anti-aliasing procedure. Accordingly, applying the complexity criteria to the glyphs partially rendered in FIGS. 4 and 5, the Latin-based character 405 satisfies the criteria, and thus an anisotropic anti-aliasing procedure is preferred.

Although the second criteria is not evaluated for the Japanese kanji character shown partially rendered in FIG. 5, because the first criteria is not satisfied, it can be noted that the glyph representing the Japanese kanji character has a cumulative horizontal length of 56.375 pixels at 11 ppem, and a corresponding complexity value of 5.13, exceeding the complexity threshold value.

If the complexity threshold value is not exceeded (the "Yes" branch of decision step 620), then the default anti-aliasing procedure is selected as the preferred anti-aliasing procedure. If either of the evaluation criteria is not satisfied (the "No" branch of decision steps 605, 620), then an alternative anti-aliasing procedure is selected as the preferred anti-aliasing procedure (step 625). In this example, the preferred anti-aliasing procedure for the Latin-based character is anisotropic anti-aliasing, and the preferred anti-aliasing procedure for the Japanese kanji character is an alternative anti-aliasing procedure.

A preferred anti-aliasing procedure can be selected from a default anti-aliasing procedure and one or more alternative anti-aliasing procedures. If more than one alternate anti-aliasing procedure is available, they can be ranked and the glyph characteristics can be compared against alternative criteria for each alternative anti-aliasing procedure by rank, until the preferred anti-aliasing procedure is determined.

In one implementation, the default anti-aliasing procedure is the procedure that produces the best (e.g., more readable) results, when the specified criteria (e.g., complexity, use of hint instructions) are satisfied. In some implementations, the partial rendering of each glyph are produced using the default anti-aliasing procedure because the glyph characteristics exhibited by the partial rendering can vary depending on the anti-aliasing procedure used to produce the partial rendering. In other implementations, a procedure other than the default anti-aliasing procedure, such as the preferred anti-aliasing procedure selected for a previously rendered glyph, can be used to produce the partial rendering.

Figure 7:
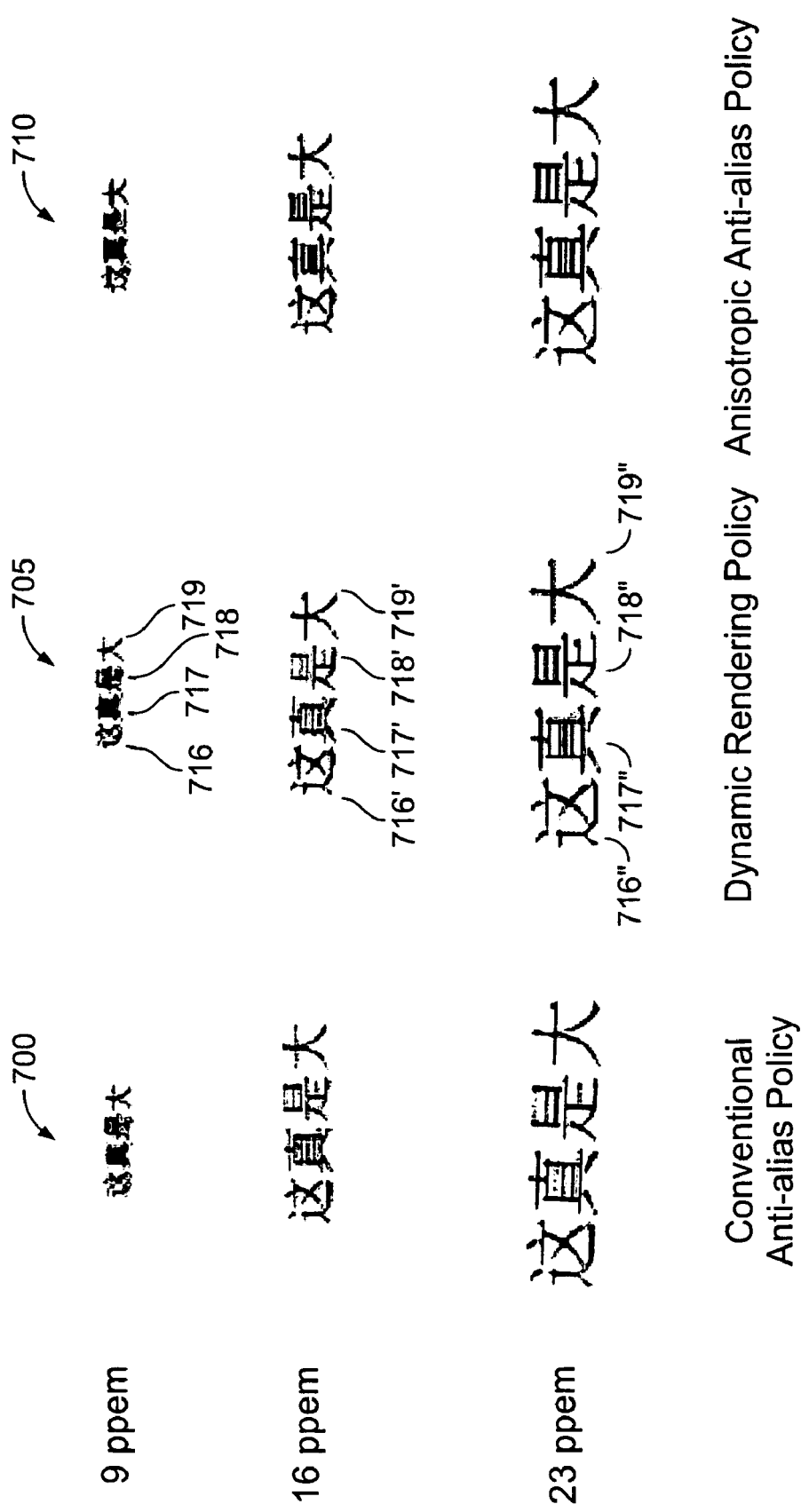
FIG. 7 shows renderings of glyph representations of Japanese kanji characters at varying sizes and rendering according to varying anti-aliasing procedures.

FIG. 7 illustrates glyph images representing four different Japanese kanji characters, each rendered using three different anti-aliasing procedures and rendered at three different sizes. The first column 700 shows glyph images of the Japanese kanji characters rendered according to a conventional anti-aliasing procedure, such as a 4×4 anti-aliasing procedure. The third column 710 shows glyph images of the Japanese kanji characters rendered according to an anisotropic anti-aliasing procedure, such as the 8×2 anisotropic anti-aliasing procedure described above. The second column 705 shows glyph images of the Japanese kanji characters 716–719 rendered according to the preferred anti-aliasing procedure of the conventional anti-aliasing procedure used for the first column 700 or the anisotropic anti-aliasing procedure used for the third column 710, determined for each glyph.

As can be seen in FIG. 7, the preferred anti-aliasing procedure for each of the glyphs at 9 ppem is the conventional anti-aliasing procedure, so that the glyph images 716–719 appear identical to the glyphs rendered according to that technique in column 700. When the size is increased to 16 ppem, the preferred anti-aliasing procedure for the first 716' and last 719' glyphs is the anisotropic anti-aliasing procedure, and for the two middle glyphs 717' and 718', the conventional isotropic anti-aliasing procedure. Thus, for the first 716' and last 719' glyphs, the preferred anti-aliasing procedure changed when the size changed from 9 ppem to 16 ppem. At 23 ppem the preferred anti-aliasing procedure for all four of the glyphs 716"–719" is the anisotropic anti-aliasing procedure.

At 9 ppem and 23 ppem the preferred anti-aliasing procedure is the same for each of the four glyphs, while at 16 ppem the preferred anti-aliasing procedure for the two more complex glyphs is the conventional isotropic anti-aliasing procedure and the preferred anti-aliasing procedure for the two less complex glyphs is the anisotropic anti-aliasing procedure, illustrating how the complexity of the glyph can affect the determination of a preferred anti-aliasing procedure. Although the preferred anti-aliasing procedure is the same for each of the four glyphs at 9 ppem and 23 ppem, the preferred anti-aliasing procedure is different in each case, illustrating how the rendering conditions, for example, size, can affect the determination of a preferred anti-aliasing procedure.

As discussed above, a partial rendering of a glyph produced using the default anti-aliasing procedure is typically discarded if the preferred anti-aliasing procedure is determined to be an alternative anti-aliasing procedure. However, under some circumstances the partial rendering of the glyph can be retained and used to complete rendering the glyph, even though an alternative anti-aliasing procedure is selected as preferred. For example, two anisotropic anti-aliasing procedures discussed above include an 8×1 anti-aliasing procedure and an 8×2 anti-aliasing procedure. The alternative 8×2 anti-aliasing procedure discussed above uses an 8×1 hinted outline, which is then scaled in the y direction, before scan conversion to an 8×2 bitmap. Accordingly, for (each of these anisotropic anti-aliasing procedures, the hinted outline is the same. Thus, a partial rendering produced using either anti-aliasing procedure can be used to fully render the glyph, regardless of which anti-aliasing procedure is determined to be preferred.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A computer-implemented method, comprising:
receiving a plurality of glyphs to be rendered; and
for each glyph:
  partially rendering the glyph using a first anti-aliasing procedure;
  evaluating one or more characteristics of the glyph based on the partial rendering; and
  selecting an anti-aliasing procedure from the first anti-aliasing procedure and one or more alternative anti-aliasing procedures based on the evaluation of the characteristics of the glyph; and
rendering the glyph based on the selected anti-aliasing procedure,
wherein rendering the glyph includes:
  discarding the partial rendering; and
  rendering the glyph using one of the alternative anti-aliasing procedures.

2. The method of claim 1, wherein partially rendering a glyph includes calculating a hinted outline of the glyph.

3. The method of claim 1, wherein:
evaluating one or more characteristics of the glyph includes determining a complexity of the glyph and comparing the complexity to a predetermined threshold value.

4. The method of claim 1, wherein evaluating one or more characteristics of the glyph includes determining whether one or more specified hint instructions were used to partially render the glyph.

5. The method of claim 1, wherein the tint anti-aliasing procedure is an anisotropic anti-aliasing procedure.

6. The method of claim 1, wherein the glyph is included in a TrueType font.

7. A computer-implemented method, comprising:
receiving a plurality of glyphs to be rendered; and
for each glyph:
  partially rendering the glyph using a first anti-aliasing procedure;
  evaluating one or more characteristics of the glyph based on the partial rendering; and
  selecting an anti-aliasing procedure from the first anti-aliasing procedure and one or more alternative anti-aliasing procedures based on the evaluation of the characteristics of the glyph; and
rendering the glyph based on the selected anti-aliasing procedure,
wherein rendering the glyph includes:
  selecting one of the alternative anti-aliasing procedures; and
  rendering the glyph using the selected alternative anti-aliasing procedure and the partial rendering of the glyph from the first anti-aliasing procedure.

8. The method of claim 7, wherein partially rendering a glyph includes calculating a hinted outline of the glyph.

9. The method of claim 7, wherein:
evaluating one or more characteristics of the glyph includes determining a complexity of the glyph and comparing the complexity to a predetermined threshold value.

10. The method of claim 7, wherein evaluating one or more characteristics of the glyph includes determining whether one or more specified hint instructions were used to partially render the glyph.

11. The method of claim 7, wherein the first anti-abasing procedure is an anisotropic anti-aliasing procedure.

12. The method of claim 7, wherein the glyph is included in a TrueType font.

13. A computer-implemented method, comprising:
receiving a plurality of glyphs to be rendered; and
for each glyph:
   partially rendering the glyph using a first anti-aliasing procedure;
   evaluating one or more characteristics of the glyph based on the partial rendering; and
   selecting an anti-aliasing procedure from the first anti-aliasing procedure and one or more alternative anti-aliasing procedures based on the evaluation of the characteristics of the glyph,
wherein:
   evaluating one or more characteristics of the glyph includes determining a complexity of the glyph and comparing the complexity to a predetermined threshold value;
   the glyph is to be rendered at a size; and
   the complexity is measured as a cumulative horizontal length of the glyph path divided by the size.

14. A computer-implemented method for rendering a plurality of glyphs, comprising:
partially rendering each glyph in a plurality of glyphs using a first anti-aliasing procedure;
determining on a glyph-by-glyph basis a preferred anti-aliasing procedure for each glyph based on the denial rendering of the glyph; and
rendering each glyph using the preferred anti-aliasing procedure determined for the glyph,
wherein rendering a glyph includes:
   discarding the partial rendering; and
   rendering the glyph using one of the alternative anti-aliasing procedures.

15. The method of claim 14, wherein partially rendering a glyph includes calculating a hinted outline of the glyph.

16. The method of claim 14, wherein the first anti-aliasing procedure is an anisotropic anti-aliasing procedure.

17. The method of claim 14, wherein the glyph is included in a TrueType font.

18. A computer-implemented method for rendering a plurality of glyphs, comprising:
partially rendering each glyph in a plurality of glyphs using a first anti-aliasing procedure;
determining on a glyph-by-glyph basis a preferred anti-aliasing procedure for each glyph based on the partial rendering of the glyph; and
rendering each glyph using the preferred anti-aliasing procedure determined for the glyph,
wherein rendering a glyph includes:
   determining the preferred anti-aliasing procedure to be one of the alternative anti-aliasing procedures; and
   rendering the glyph using the preferred alternative anti-aliasing procedure and the partial rendering of the glyph from the first anti-aliasing procedure.

19. The method of claim 18, wherein partially rendering a glyph includes calculating a hinted outline of the glyph.

20. The method of claim 18, wherein the first anti-aliasing procedure is an anisotropic anti-aliasing procedure.

21. The method of claim 18, wherein the glyph is included in a TrueType font.

22. A computer program product, tangibly stored on a computer-readable medium, comprising instructions operable to cause a programmable processor to:
receive a plurality of glyphs to be rendered; and
for each glyph;
partially render a glyph using the first anti-aliasing procedure;
evaluate one or more characteristics of the glyph based on the partial rendering; and
select an anti-aliasing procedure from the first anti-aliasing procedure and one or more alternative anti-aliasing procedures based on the evaluation of the characteristics of the glyph; and
render the glyph based on the selected anti-aliasing procedure,
wherein instructions operable to render the glyph include instructions operable to:
   discard the partial rendering; and
   render the glyph using one of the alternative anti-aliasing procedures.

23. The computer program product of claim 22, wherein instructions operable to partially render a glyph include instructions operable to calculate a hinted outline of the glyph.

24. The computer program product of claim 22, wherein:
instructions operable to evaluate one or more characteristics of the glyph include instructions operable to determine a complexity of the glyph and compare the complexity to a predetermined threshold value.

25. The computer program product of claim 22, wherein instructions operable to evaluate one or more characteristics of the glyph include instructions operable to determine whether one or more specified hint instructions were used to partially render the glyph.

26. The computer program product of claim 22, wherein the first anti-aliasing procedure is an anisotropic anti-aliasing procedure.

27. The computer program product of claim 22, wherein the glyph is included in a TrueType font.

28. A computer program product, tangibly stored on a computer-readable medium, comprising instructions operable to cause a programmable processor to:
receive a plurality of glyphs to be rendered; and
for each glyph;
partially render a glyph using the first anti-aliasing procedure;
evaluate one or more characteristics of the glyph based on the partial rendering; and
select an anti-aliasing procedure from the first anti-aliasing procedure and one or more alternative anti-aliasing procedures based on the evaluation of the characteristics of the glyph; and
render the glyph based on the selected anti-aliasing procedure,
wherein instructions operable to render the glyph include instructions operable to:
   select one of the alternative anti-aliasing procedures; and
   render the glyph using the selected alternative anti-aliasing procedure and the partial rendering of the glyph from the first anti-aliasing procedure.

29. The computer program product of claim 28, wherein instructions operable to partially render a glyph include instructions operable to calculate a hinted outline of the glyph.

30. The computer program product of claim 28, wherein:
instructions operable to evaluate one or more characteristics of the glyph include instructions operable to determine a complexity of the glyph and compare the complexity to a predetermined threshold value.

31. The computer program product of claim 28, wherein instructions operable to evaluate one or more characteristics of the glyph include instructions operable to determine whether one or more specified hint instructions were used top partially render the glyph.

32. The computer program product of claim 28, wherein the first anti-aliasing procedure is an anisotropic anti-aliasing procedure.

33. The computer program product of claim 28, wherein the glyph is included in a TrueType font.

34. A computer program product, tangibly stored on a computer-readable medium, comprising instructions operable to cause a programmable processor to:
   receive a plurality of glyphs to be rendered; and
   for each glyph;
   partially render a glyph using the first anti-aliasing procedure;
   evaluate one or more characteristics of the glyph based on the partial rendering; and
   select an anti-aliasing procedure from the first anti-aliasing procedure and one or more alternative anti-aliasing procedures based on the evaluation of the characteristics of the glyph,
   wherein:
      instructions operable to evaluate one or more characteristics of the glyph include instructions operable to determine a complexity of the glyph and compare the complexity to a predetermined threshold value;
      the glyph is to be rendered at a size; and
      the complexity is measured as a cumulative horizontal length of the glyph path divided by the size.

35. A computer program product, tangibly stored on a computer-readable medium, for rendering a plurality of glyphs, comprising instructions operable to cause a programmable processor to:
   partially render each glyph in a plurality of glyphs using a first anti-aliasing procedure;
   determine on a glyph-by-glyph basis a preferred anti-aliasing procedure for each glyph based on the partial of the glyph; and
   render each glyph using the preferred anti-aliasing procedure determined for the glyph,
   wherein instructions operable to render a glyph include instructions operable to:
      discard the partial rendering; and
      render the glyph using one of the alternative anti-aliasing procedures.

36. The computer program product of claim 35, wherein instructions operable to partially render a glyph include instructions operable to calculate a hinted outline of the glyph.

37. The computer program product of claim 35, wherein the first anti-aliasing procedure is an anisotropic anti-aliasing procedure.

38. The computer program product of claim 35, wherein the glyph is included in a TrueType font.

39. A computer program product, tangibly stored on a computer-readable medium, for rendering a plurality of glyphs, comprising instructions operable to cause a programmable processor to:
   partially render each glyph in a plurality of glyph using a first anti-aliasing procedure;
   determine on a glyph-by-glyph basis a preferred anti-aliasing procedure for each glyph based on the partial rendering of the glyph; and
   render each glyph using the preferred anti-aliasing procedure determined for the glyph,
   wherein instructions operable to render a glyph include instructions operable to:
      determine the preferred anti-aliasing procedure to be one of the alternative anti-aliasing procedures; and
      render the glyph using the preferred alternative anti-aliasing procedure and the partial rendering of the glyph from the first anti-aliasing procedure.

40. The computer program product of claim 39, wherein instructions operable to partially render a glyph include instructions operable to calculate a hinted outline of the glyph.

41. The computer program product of claim 39, wherein the first anti-aliasing procedure is an anisotropic anti-aliasing procedure.

42. The computer program product of claim 39, wherein the glyph is included in a TrueType font.

* * * * *

UNITED STATES PATENT AND TRADEMARK OFFICE
CERTIFICATE OF CORRECTION

PATENT NO. : 7,002,597 B2
APPLICATION NO. : 10/440489
DATED : February 21, 2006
INVENTOR(S) : R. David Arnold and Terence S. Dowling It is certified that error appears in the above-identified patent and that said Letters Patent is hereby corrected as shown below:

Column 8, line 30, delete "tint" and replace with --first--;
          line 64, delete "abasing" and replace with --aliasing--;
Column 9, line 25, delete "denial" and replace with --partial--;
Column 11, line 37, before "of", insert --rendering--;
Column 12, line 17, delete "glyph" and insert --glyphs--.

Signed and Sealed this

First Day of August, 2006

JON W. DUDAS
*Director of the United States Patent and Trademark Office*